March 10, 1931. W. H. HALLEY 1,795,600
THROTTLE CONTROL FOR MOTOR VEHICLES
Filed Sept. 4, 1928
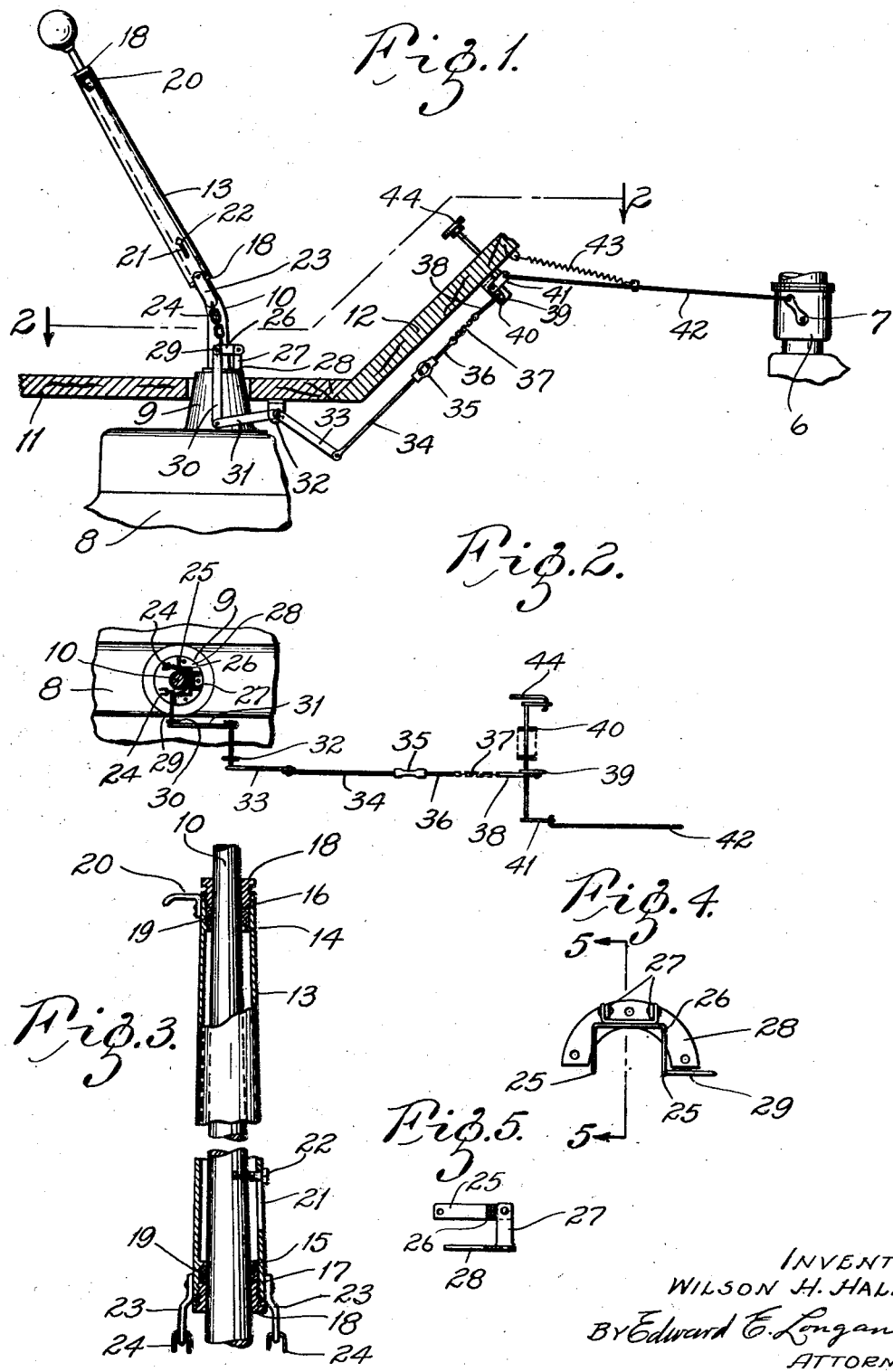
INVENTOR:
WILSON H. HALLEY.
By Edward E. Longan
ATTORNEY.

Patented Mar. 10, 1931

1,795,600

UNITED STATES PATENT OFFICE

WILSON H. HALLEY, OF ST. LOUIS, MISSOURI

THROTTLE CONTROL FOR MOTOR VEHICLES

Application filed September 4, 1928. Serial No. 303,679.

My invention relates to improvements in throttle control for motor vehicles, and has for its primary object a throttle control to be used on motor vehicles having a sliding gear transmission which, in addition to the regular throttle control on the steering wheel column and foot throttle, has a throttle mounted on the gear shift lever.

A further object is to construct a throttle control for motor vehicles which is so arranged that the throttle can be controlled from the gear shift lever thus permitting the driver of a motor vehicle to keep both feet on and operate the clutch and service brake pedals simultaneously.

A still further object is to construct a throttle control for motor vehicles, which control is mounted on the shift lever thereby permitting an operator of a motor vehicle to keep tight hold on the steering wheel while shifting gears and at the same time giving him full control of the engine speed.

In the drawings:

Fig. 1 is a side elevation of my device in position with parts of the carburetor and transmission housing broken away and the floor and toe boards of a motor vehicle in section.

Fig. 2 is a section taken on the line 2—2 of Fig. 1 with the toe and floor boards removed.

Fig. 3 is an enlarged vertical section with parts broken away of that part of the control which is mounted on the shift lever.

Fig. 4 is a top plan view of the yoke employed; and

Fig. 5 is a cross section taken on the line 5—5 of Fig. 4.

In the construction of my device I employ a carburetor 6, which is provided with the usual throttle valve 7. This throttle valve and carburetor may be of any standard type and is, therefore, not disclosed in detail. 8 represents the housing of a sliding gear transmission. This housing is provided with an upwardly extending boss or lug 9 in which is pivotally mounted a gear shift lever 10. The boss 9 extends upward through the floor board 11 of an automobile. 12 represents the toe board.

Surrounding the shift lever 10 is a sleeve or tubular member 13, which is provided adjacent its upper end with an inwardly projecting flange 14 and adjacent its lower end with an inwardly projecting flange 15. The upper end 16 and lower end 17 of the sleeve or tubular member 13 are screw threaded internally so as to receive a nut 18.

Resting on the flanges 14 and 15 is a gasket 19. This gasket is preferably of raw hide and is held on the flanges 14 and 15 by the nuts 18 and by tightening these nuts 18 the gasket is brought into contact with the shift lever 10. This prevents any vibration and consequent rattling of the sleeve or tube 13 on this lever.

The upper end of the member 13 is provided with a hook or handle 20, which is adapted to be engaged by the fingers of the driver for manipulating the throttle mechanism. The member 13 is also slotted as at 21 and through this slot extends a screw or pin 22, which pin is secured in the lever 10 and is for the purpose of preventing the member 13 from turning.

Secured to the member 13 and at diametrically opposite sides thereof are links or ears 23, which have one end of the chains 24 secured therein. The opposite ends of these chains are secured to the ends 25 of a yoke 26. This yoke is pivotally carried by arms 27 extending upward from a plate 28, the plate 28 being secured on top of the boss 9.

The yoke 26 is also provided with an outwardly extending arm 29 to which is pivotally attached one end of a link 30. The opposite end of this link is attached to a lever 31, which is pivotally carried by a bracket 32. This bracket is preferably secured to the underside of the floor board 11.

Pivotally carried by the bracket 32 is a second arm 33, which has pivotally attached to its free end one end of a rod 34. The opposite end of this rod is provided with a turnbuckle 35 and in this turn-buckle is secured a rod 36. To the end of the rod 36 is attached a chain 37, the purpose of which will be explained in detail later and to this chain is attached a rod 38. The rod 38 has its end pivotally attached to a lever 39, which lever is pivotally carried by a bracket 40. Carried by the bracket 40 is a second arm 41, to the end of which is pivotally attached a rod 42, which rod leads to the throttle valve 7. A spring 43 is secured to the rod 42 and to any suitable point on the vehicle. This spring has a normal tendency to keep the throttle valve in closed position. 44 represents the ordinary foot throttle, which also manipulates the rod 42 but, as this construction is well known in the art, it will not be described in detail.

The purpose of the chain 37, before mentioned, is to permit the manipulation of the throttle by means of the foot control without in any way operating the sleeve or member 13 and the balance of the mechanism between the chain 37 and the sleeve, and the purpose of the turn-buckle 35 permits the proper adjustment and taking up of any slack which might occur.

I have found it preferable to leave the chains 24 slightly loose so that as the shift lever is rocked from side to side it will in no way manipulate the yoke 26.

The operation of my device is as follows:

I will assume that the engine of the motor vehicle is running and the device is in neutral. Then, as is well known, it is necessary to manipulate the clutch in order to disconnect the transmission from the engine before shifting. It also frequently happens that the vehicle is on a slight grade and, as soon as this is done, will commence to move. It will then be necessary to employ the service brake to keep the car from rolling either forward or back. When this is done it is impossible to speed up the engine in any way without detaching the hand from the steering wheel because one hand is already on the shift lever. The foot throttle cannot be used because the operator is manipulating the service brake. Therefore, it is impossible to speed up the engine properly and gradually as should be done, but with my device the driver or operator merely hooks his fingers under the extension 20 and by pulling up on the member 13 causes the chains 23 to tighten, raises the yoke 26, and through the various lever connections will commence to open the engine throttle giving the engine greater speed.

When the desired speed has been reached, the next highest shift will, of course, call for speeding up the engine, then disconnecting the driving clutch, then shifting gears and simultaneously with the shifting of gears slowing down the engine and after the clutch has been again re-engaged speed up the engine. All of this speeding up of the engine can be readily done without removing the one hand from the shift lever and without removing the other hand from the steering wheel. This is a great convenience for drivers who are not used to operating a foot throttle and it is also, as aforementioned, a great convenience when a vehicle becomes stalled on a hill and commences to roll backward because when this occurs, it is only the most experienced of drivers who are again able to get their vehicle started for the reason that they cannot properly manipulate the throttle while using the service brake and the clutch.

It is also practically impossible with the present motor vehicles to operate the hand throttle at all when only one hand is available for the steering wheel for the reason that the throttle lever is only about two inches long, whereas most steering wheels are seventeen to eighteen inches in diameter and consequently this lever is out of reach of the fingers of the driver if he attempts to keep his hands on the wheel rim.

Having fully described my invention, what I claim is:—

1. A throttle control for motor vehicles comprising the combination with a motor vehicle having a sliding gear transmission provided with a shift lever, and a throttle valve-controlled carburetor, of a longitudinally moving nonrotatable sleeve having a projection carried by said shifting lever, and flexible adjustable means for connecting said sleeve to the throttle valve of said carburetor whereby said throttle and said shift lever can be operated independently of each other.

2. A throttle control for motor vehicles comprising the combination with a motor vehicle, a carburetor having a throttle valve and a sliding gear transmission having a gear shift lever, of a non-rotatable sleeve carried by said gear shift lever for operating the throttle valve of said carburetor without moving said gear shift lever, and an adjustable flexible connection between the sleeve carried by the shift lever and the throttle valve of the carburetor whereby said throttle valve can be operated independently of the position of the shift lever.

3. A throttle control for motor vehicles comprising the combination with a motor vehicle having a sliding gear transmission provided with a shift lever, a throttle valve-controlled carburetor, of a longitudinally moving sleeve having a projection carried by said shifting lever, means for connecting said sleeve to the throttle valve of said carburetor whereby said throttle can be operated without moving said shift lever, and a flexible connection between the means carried by the shift lever and the throttle valve of the carburetor whereby said throttle valve can be foot operated and without moving the control on the shift lever.

4. A throttle control for motor vehicles comprising the combination with a motor vehicle having a sliding gear transmission provided with a shift lever, a throttle valve-controlled carburetor, of a longitudinally moving sleeve having a projection carried by said shifting lever, adjustable flexible means for connecting said sleeve to the throttle valve of said carburetor whereby said throttle can be operated without moving said shift lever, and means carried by the shift lever and engaging with said sleeve for preventing rotation of the same.

5. A throttle control for motor vehicles comprising the combination with a motor vehicle having a sliding gear transmission provided with a shift lever, a throttle valve-controlled carburetor, of a longitudinally moving sleeve having a projection carried by said shifting lever, means for connecting said sleeve to the throttle valve of said carburetor whereby said throttle can be operated without moving said shift lever, and adjustable means for preventing vibration of said sleeve.

6. A throttle control for motor vehicles comprising the combination with a motor vehicle, a carburetor having a throttle valve and a sliding gear transmission having a gear shift lever, of means carried by said gear shift lever for operating the throttle valve of said carburetor without moving said gear shift lever, a flexible connection between the means carried by the shift lever and the throttle valve of the carburetor whereby said throttle valve can be foot operated without moving the control on the shift lever, said flexible means also permitting said shift lever to be operated without operating said throttle control.

In testimony whereof I have affixed my signature.

WILSON H. HALLEY.